(12) United States Patent
Ouellet

(10) Patent No.: US 6,937,806 B2
(45) Date of Patent: Aug. 30, 2005

(54) METHOD OF MAKING PHOTONIC DEVICES WITH SOG INTERLAYER

(75) Inventor: Luc Ouellet, Granby (CA)

(73) Assignee: Dalsa Semiconductor Inc., Waterloo (CA)

( * ) Notice: Subject to any disclaimer, the term of this patent is extended or adjusted under 35 U.S.C. 154(b) by 343 days.

(21) Appl. No.: 10/101,622

(22) Filed: Mar. 21, 2002

(65) Prior Publication Data

US 2003/0180021 A1 Sep. 25, 2003

(51) Int. Cl.[7] .............................................. G02B 6/10
(52) U.S. Cl. ................................................... 385/129
(58) Field of Search ................................ 385/122–124, 385/129–132, 146

(56) References Cited

U.S. PATENT DOCUMENTS

| 4,830,984 | A |   | 5/1989 | Purdes |  |
|---|---|---|---|---|---|
| 4,896,930 | A |   | 1/1990 | Tsuchitani et al. | 350/96.12 |
| 5,291,574 | A |   | 3/1994 | Levenson et al. | 385/129 |
| 5,972,516 | A |   | 10/1999 | Kaneko et al. | 428/429 |
| 6,088,492 | A |   | 7/2000 | Kaneko et al. | 385/14 |
| 6,678,093 | B1 | * | 1/2004 | Scobey et al. | 359/578 |

FOREIGN PATENT DOCUMENTS

| EP | 1 293 811 |   | 3/2003 |
|---|---|---|---|
| JP | 57 153445 |   | 9/1982 |
| JP | 06 214128 |   | 6/1987 |
| JP | 63 184708 |   | 7/1988 |
| JP | 03-284707 | * | 12/1991 |
| JP | 05-188231 | * | 7/1993 |
| JP | 06 174951 |   | 6/1994 |
| JP | 2000 215504 |   | 8/2000 |

OTHER PUBLICATIONS

Chua et al, Dielectrically–bonded Long Wavelength Vertical Cavity Laser on GaAs Substrates using Strain–Compensated Multiple Quantum Wells, IEEE Photonics Technology Letters, vol. 6, No. 12, Dec. 1994.*

Wachter C. et al: :Integrated optics toward the third dimension Proceedings of the SPIE, SPIE, Bellingham, VA USA vol. 3278, Jan. 28, 1998 pp. 102–111 XP002269632—p. 105, para 6.

D.M. Gill et al, "Thin film channel waveguides fabricated in metalorganic chemical vapor deposition grown BaTiO3 on MgO" Applied Physics Letters, vol. 69 No. 20, Nov. 11, 1996, pp. 2968–2970 XP002297635 p. 2969, col. 1, para 2—p. 2969 col 2, para 2 table 1.

* cited by examiner

Primary Examiner—Tu T. Nguyen
(74) Attorney, Agent, or Firm—Marks & Clerk; Richard J. Mitchell (57) ABSTRACT

A method of making a photonic device having at least two layers formed over a substrate, preferably by plasma enhanced chemical vapor deposition, involves depositing a thin spin-on glass (SOG) interlayer between at least one adjacent pair of layers to improve the roughness characteristics.

33 Claims, 11 Drawing Sheets

| $L_U$ | | $C_U$ | | $S_U$ | |
|---|---|---|---|---|---|
| THz | nm | THz | nm | THz | nm |
| 186.00 | 1611.79 | 191.00 | 1569.59 | 196.00 | 1529.55 |
| 186.10 | 1610.92 | 191.10 | 1568.77 | 196.10 | 1528.77 |
| 186.20 | 1610.06 | 191.20 | 1567.95 | 196.20 | 1527.99 |
| 186.30 | 1609.19 | 191.30 | 1567.13 | 196.30 | 1527.22 |
| 186.40 | 1608.33 | 191.40 | 1566.31 | 196.40 | 1526.44 |
| 186.50 | 1607.47 | 191.50 | 1565.50 | 196.50 | 1525.66 |
| 186.60 | 1606.60 | 191.60 | 1564.68 | 196.60 | 1524.89 |
| 186.70 | 1605.74 | 191.70 | 1563.86 | 196.70 | 1524.11 |
| 186.80 | 1604.88 | 191.80 | 1563.05 | 196.80 | 1523.34 |
| 186.90 | 1604.03 | 191.90 | 1562.23 | 196.90 | 1522.56 |
| 187.00 | 1603.17 | 192.00 | 1561.42 | 197.00 | 1521.79 |
| 187.10 | 1602.31 | 192.10 | 1560.61 | 197.10 | 1521.02 |
| 187.20 | 1601.46 | 192.20 | 1559.79 | 197.20 | 1520.25 |
| 187.30 | 1600.60 | 192.30 | 1558.98 | 197.30 | 1519.48 |
| 187.40 | 1599.75 | 192.40 | 1558.17 | 197.40 | 1518.71 |
| 187.50 | 1598.89 | 192.50 | 1557.36 | 197.50 | 1517.94 |
| 187.60 | 1598.04 | 192.60 | 1556.55 | 197.60 | 1517.17 |
| 187.70 | 1597.19 | 192.70 | 1555.75 | 197.70 | 1516.40 |
| 187.80 | 1596.34 | 192.80 | 1554.94 | 197.80 | 1515.63 |
| 187.90 | 1595.49 | 192.90 | 1554.13 | 197.90 | 1514.87 |
| 188.00 | 1594.64 | 193.00 | 1553.33 | 198.00 | 1514.10 |
| 188.10 | 1593.79 | 193.10 | 1552.52 | 198.10 | 1513.34 |
| 188.20 | 1592.95 | 193.20 | 1551.72 | 198.20 | 1512.58 |
| 188.30 | 1592.10 | 193.30 | 1550.92 | 198.30 | 1511.81 |
| 188.40 | 1591.26 | 193.40 | 1550.12 | 198.40 | 1511.05 |
| 188.50 | 1590.41 | 193.50 | 1549.32 | 198.50 | 1510.29 |
| 188.60 | 1589.57 | 193.60 | 1548.51 | 198.60 | 1509.53 |
| 188.70 | 1588.73 | 193.70 | 1547.72 | 198.70 | 1508.77 |
| 188.80 | 1587.88 | 193.80 | 1546.92 | 198.80 | 1508.01 |
| 188.90 | 1587.04 | 193.90 | 1546.12 | 198.90 | 1507.25 |
| 189.00 | 1586.20 | 194.00 | 1545.32 | 199.00 | 1506.49 |
| 189.10 | 1585.36 | 194.10 | 1544.53 | 199.10 | 1505.74 |
| 189.20 | 1584.53 | 194.20 | 1543.73 | 199.20 | 1504.98 |
| 189.30 | 1583.69 | 194.30 | 1542.94 | 199.30 | 1504.23 |
| 189.40 | 1582.85 | 194.40 | 1542.14 | 199.40 | 1503.47 |
| 189.50 | 1582.02 | 194.50 | 1541.35 | 199.50 | 1502.72 |
| 189.60 | 1581.18 | 194.60 | 1540.56 | 199.60 | 1501.97 |
| 189.70 | 1580.35 | 194.70 | 1539.77 | 199.70 | 1501.21 |
| 189.80 | 1579.52 | 194.80 | 1538.98 | 199.80 | 1500.46 |
| 189.90 | 1578.69 | 194.90 | 1538.19 | 199.90 | 1499.71 |
| 190.00 | 1577.86 | 195.00 | 1537.40 | 200.00 | 1498.96 |
| 190.10 | 1577.03 | 195.10 | 1536.61 | 200.10 | 1498.21 |
| 190.20 | 1576.20 | 195.20 | 1535.82 | 200.20 | 1497.46 |
| 190.30 | 1575.37 | 195.30 | 1535.04 | 200.30 | 1496.72 |
| 190.40 | 1574.54 | 195.40 | 1534.25 | 200.40 | 1495.97 |
| 190.50 | 1573.71 | 195.50 | 1533.47 | 200.50 | 1495.22 |
| 190.60 | 1572.89 | 195.60 | 1532.68 | 200.60 | 1494.48 |
| 190.70 | 1572.06 | 195.70 | 1531.90 | 200.70 | 1493.73 |
| 190.80 | 1571.24 | 195.80 | 1531.12 | 200.80 | 1492.99 |
| 190.90 | 1570.42 | 195.90 | 1530.33 | 200.90 | 1492.25 |

METHOD OF MAKING PHOTONIC DEVICES WITH SOG INTERLAYER

BACKGROUND OF THE INVENTION

1. Field of the Invention

This invention relates to the field of photonics, and in particular to a method of making photonic devices, such as multiplexers (Mux) and demultiplexers (demux), and a photonic device having a novel structure.

2. Description of Related Art

The manufacture of integrated optical devices such as optical multiplexers and demultiplexers requires the fabrication of silica waveguides from low refractive index buffer and cladding silica layers and from a high refractive index core silica layer over a silicon wafer. The buffer, core and cladding silica layers must have excellent optical transparency in the 1.50 $\mu$m S-band, the 1.55 $\mu$m C-band and the 1.60 L-band for use as effective photonic devices.

Figure 1:
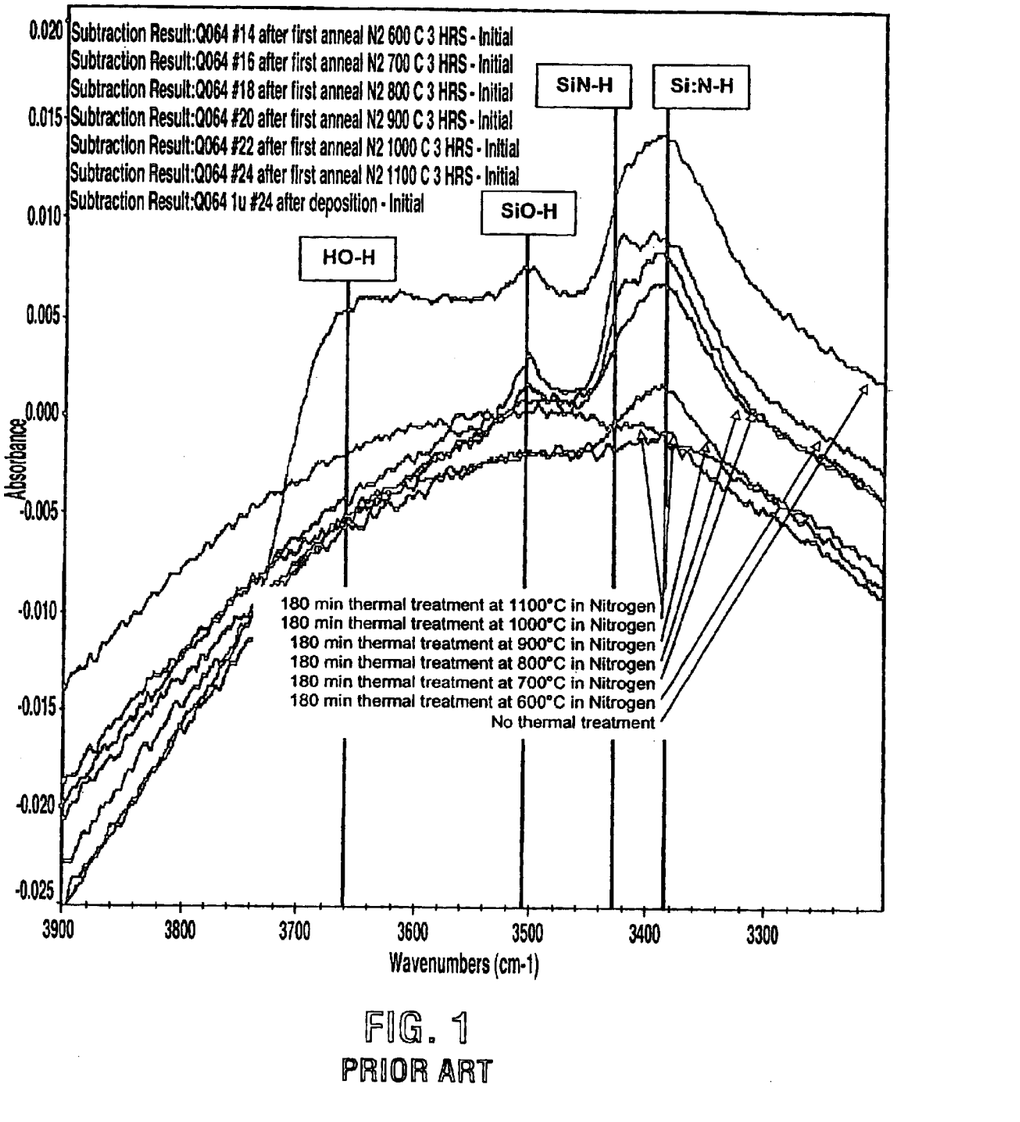
FIG. 1 shows the FTIR spectra of a buffer layer deposited with a typical PECVD process after a thermal treatment at 600° C. to 1100° C.
Figure 2:
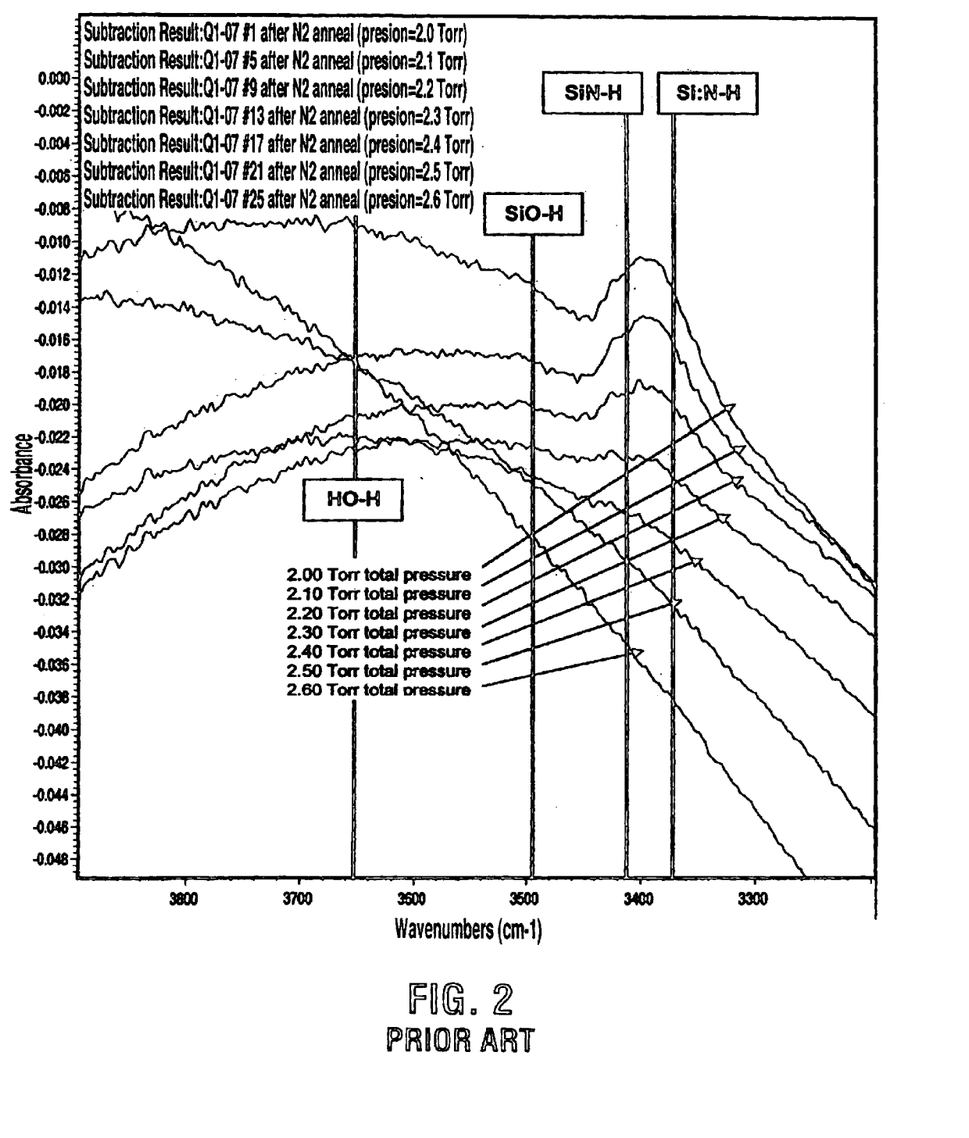
FIG. 2 shows the FTIR spectra of buffer layer obtained with the technique described in our co-pending U.S. patent application Ser. No. S-216 after a thermal treatment at 800° C.

FIGS. 1 and 2 taken from our U.S. co-pending patent application Ser. No. 09/833,711, the contents of which are incorporated herein by reference, clearly demonstrate that the novel PECVD technique described and claimed therein results in low refractive index buffer and cladding silica layers free of the undesirable residual SiN—H and Si:N—H oscillators, which show up as an FTIR peak centered at 3380 cm−1 and whose second harmonic causes optical absorption in the 1.55 $\mu$m C-band.

Figure 3:
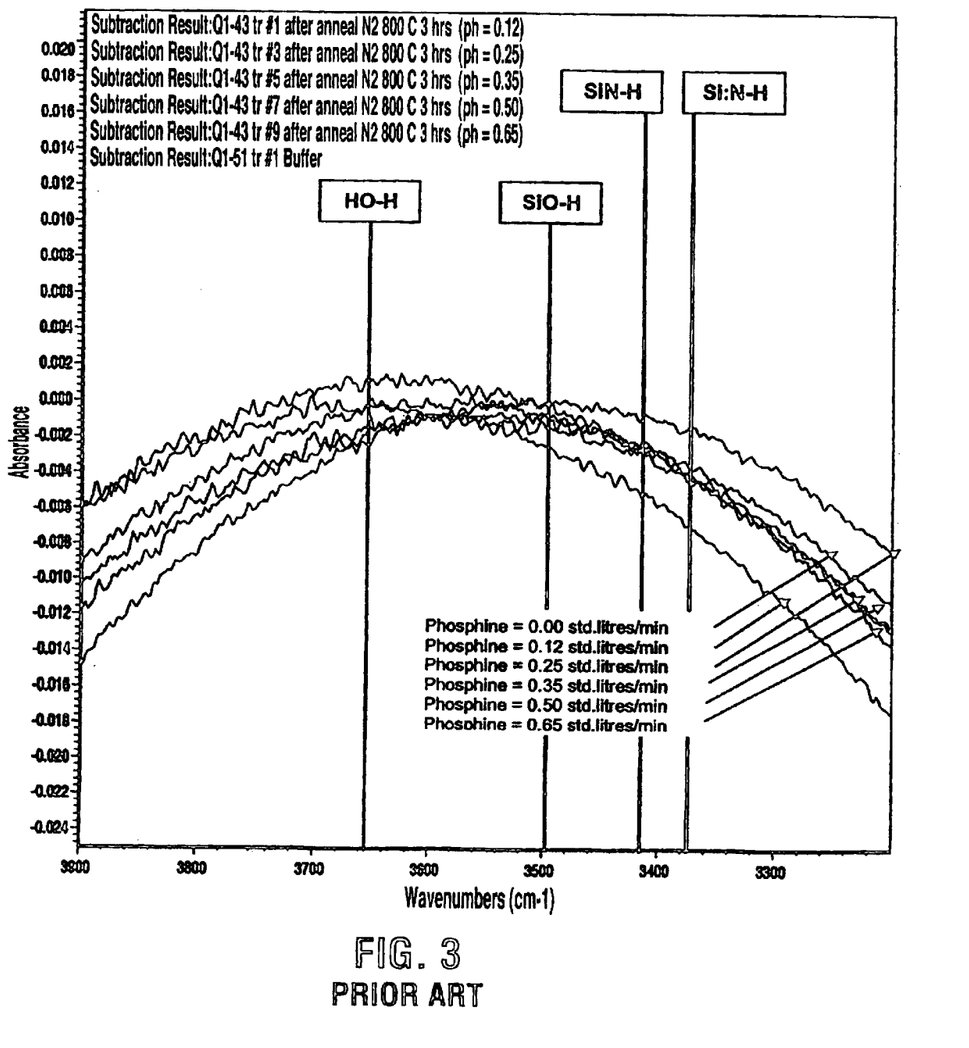
FIG. 3 shows the FTIR spectra from of core layer obtained with the technique described in our co-pending U.S. patent application Ser. No. S-221 after a thermal treatment at 800° C.

FIG. 3 taken from our co-pending U.S. patent application Ser. No. 09/867,662, the contents of which are incorporated herein by reference, clearly demonstrates that the novel PECVD technique described and claimed therein results in a high refractive index core silica layer also free from the undesirable residual SiN—H and Si:N—H oscillators.

Figure 4:
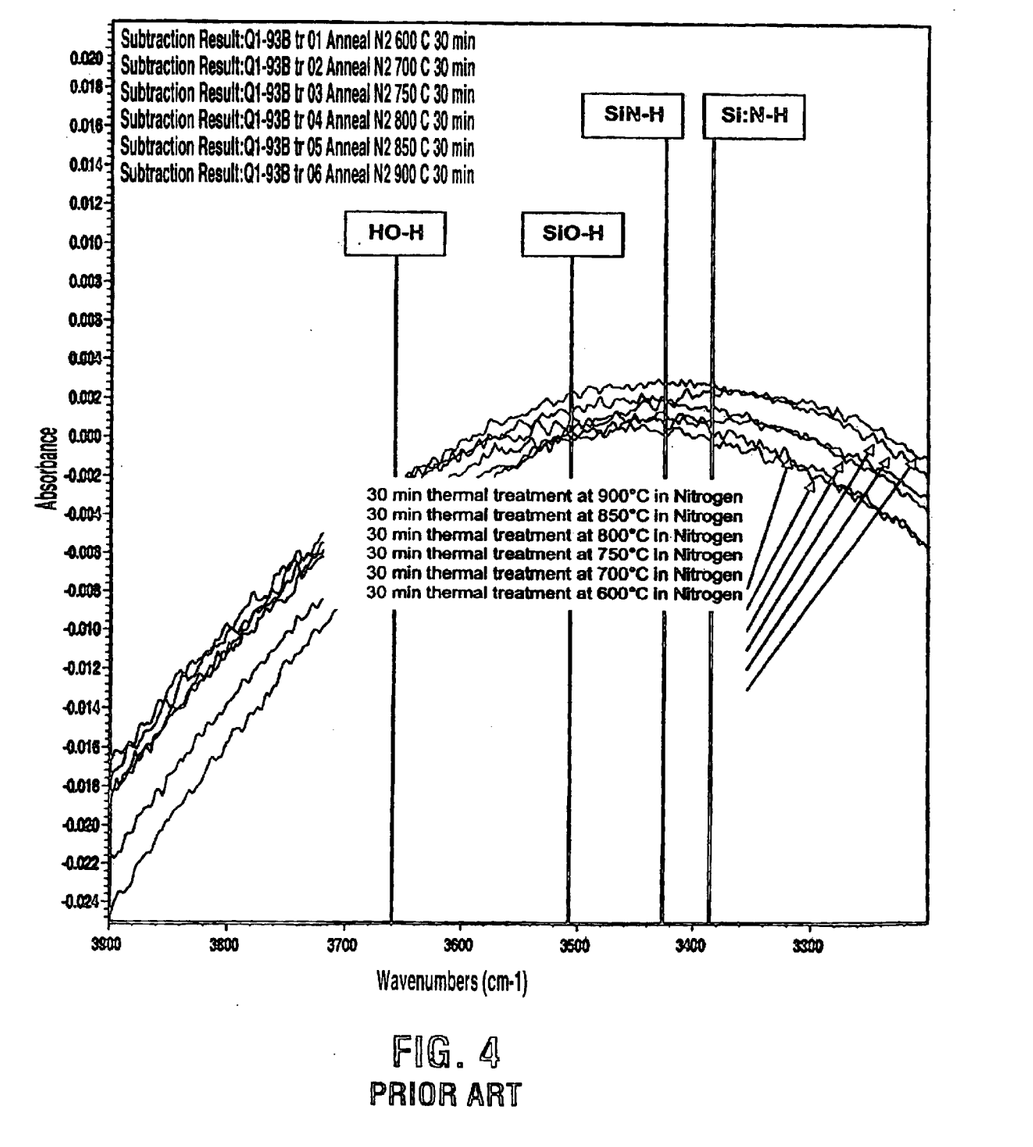
FIG. 4 shows the FTIR spectra from of core layer obtained with the technique described in our co-pending U.S. patent application Ser. No. S-234 after a thermal treatment at various temperatures.

FIG. 4 taken from our co-pending U.S. patent application Ser. No. 09/956,916, the contents of which are herein incorporated by reference, demonstrates that a high refractive index core silica layer free from the undesirable residual SiN—H and Si:N—H oscillators can be achieved after a thermal treatment of only 600° C.

Figure 5:
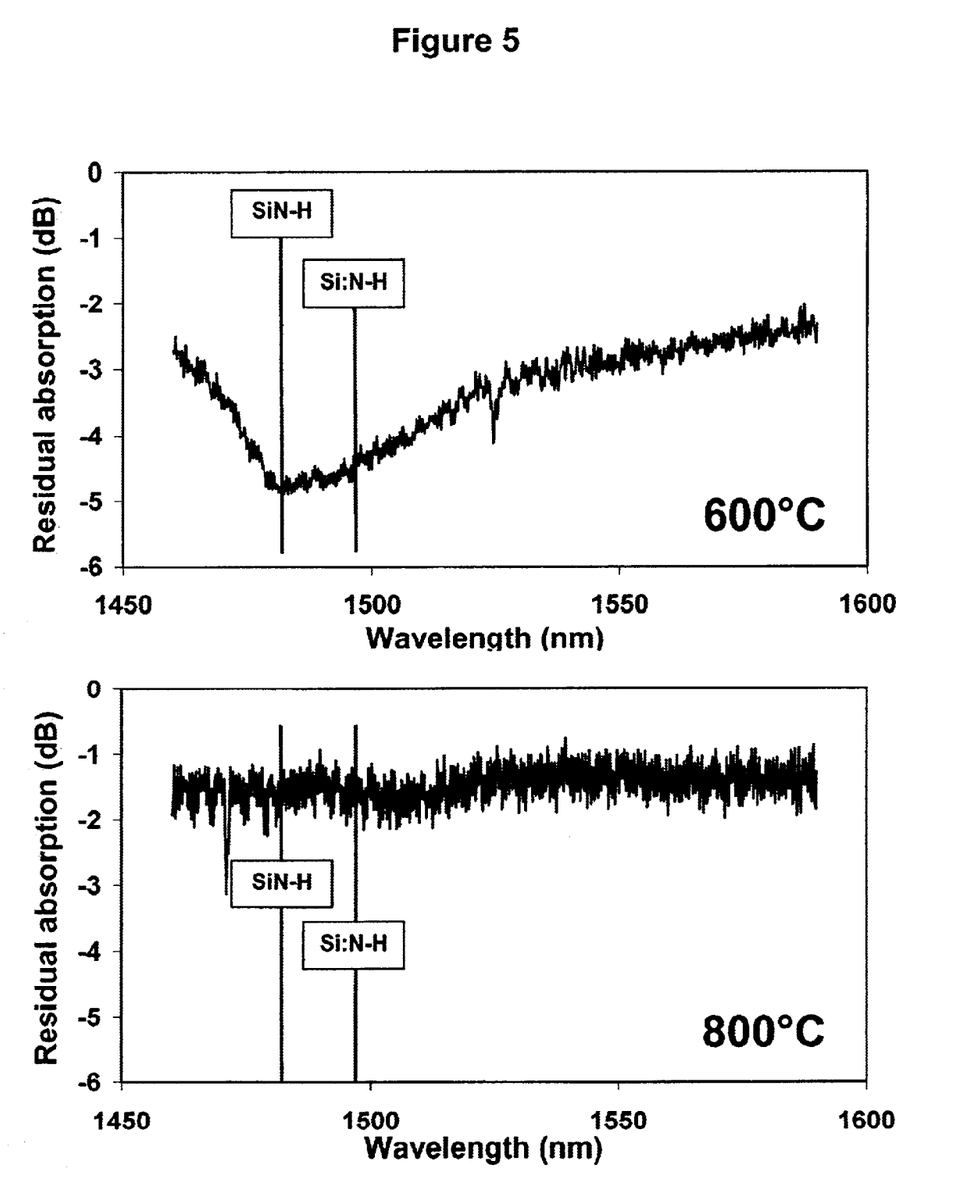
FIG. 5 shows residual infrared optical absorption of the optical waveguides following a thermal treatment at either 600° C. or 800° C.

FIG. 5 shows the residual infrared optical absorption performance of optical waveguides fabricated from the combination of a buffer, core and cladding layer and following a thermal treatment at either 600° C. or 800° C. so as to completely eliminate the residual SIN—H and Si:N—H oscillators of the silica layers. The residual optical absorption of the waveguides treated at 800° C. is mainly limited by light scattering at the various vertical and horizontal interfaces between the core and its surrounding cladding and buffer layers. This residual light scattering can be reduced if the roughness of these vertical and horizontal interfaces can be reduced. This reduction of the vertical interfaces can be achieved by using special masking and deep-etch techniques so as to provide smooth side-walls.

Hitachi, Ltd. (Tokyo, Japan) U.S. Pat. No. 4,896,930, the contents of which are herein incorporated by reference, describes a series of process steps that can be used to prepare a substrate which has a hollow part intended to form an optical waveguide by charging an organic nonlinear optical material. Electrodes and other circuit elements are formed on the surface of a silicon substrate and followed by a SiO$_2$ layer either deposited by CVD or grown by thermal oxidation. An opening having a width narrower than that of the required optical waveguide is etched in the SiO$_2$ layer at a predetermined position. An isotropic etch of the silicon substrate is then performed using the SiO$_2$ layer as a hard mask, thus providing a channel having a width larger than that of the opening of the SiO$_2$ layer. Thermal oxidation of the silicon substrate sidewalls of the formed channel allows the formation of a SiO$_2$ layer. A SOG layer is then coated on the surface and heat treated at a temperature of about 450° C. or more as to form a SOG layer that closes the opening without entering into the opening, thus forming a hollow part. Finally, an optical waveguide can then be formed by loading an organic non-linear optical material in the molten state into the hollow part by capillary action or vacuum suction.

France Telecom U.S. Pat. No. 5,291,574 describes a method of making strip optical waveguides based on polymer materials on a gallium arsenide (GaAs) substrate This method involves spin coating a lower layer of low refractive index SOG polymer buffer (n=1.40) followed by its curing at about 450° C.; spin coating a high refractive index core polymer, such as polymethylmethacrylate (n=1.49), containing active molecules that can be oriented by exposing the core polymer to a corona discharge at a temperature close to about 100° C., thus providing electro-optic properties to the core polymer; depositing a 0.15 $\mu$m thick silicon nitride (Si$_3$N$_4$) layer followed by its patterning using a photoresist based photolithography with a CF$_4$ plasma; selective etching of the high refractive index electro-optic core polymer (using an oxygen plasma and the silicon nitride layer as hard mask) until the lower buffer polymer layer is exposed; etching of the silicon nitride hard mask layer protecting the core polymer; and depositing a low refractive index cladding polymer onto the resulting structure followed by a cure at about 100° C.

The resulting optical waveguides have poor optical performance, with a reported value of 2 dB/cm. This is not at all surprising considering the low temperature of the thermal treatments of the various layers.

Kyocera Corporation (Kyoto, Japan) U.S. Pat. No. 5,972,516 describes a method of manufacturing a single mode silica-based optical waveguide using a 7 $\mu$m thick and 7 $\mu$m wide core having a refractive index 0.25% higher than its overlaying cladding. The 7 $\mu$m thick core layer can be fabricated by: a CVD method, a FHD (Flame Hydrolysis Deposition) method, a vacuum evaporation method, a sputtering method, and a SOG (spin on glass) method using alkoxy silane as a starting material. The propagation loss can be reduced if the surfaces of this core layer have a roughness (Ra) of at least ¹⁄₁₀ or less of a light source wavelength to be used. The SOG method of producing the core layer merits attention since it allows the formation of smooth surfaces, low temperature film formation in a short time and low cost. In this method, the refractive index of the SOG-based core layer is controlled by a known amount of a metal alkoxide added to the siloxane-containing polymer SOG solution to be spun. However, the SOG method of producing the core layer is difficult to use since the required thickness of several $\mu$m causes two problems: cracking, from the associated large volume shrinkage, and birefringence, from the associated large internal stress.

Kyocera Corporation (Kyoto, Japan) U.S. Pat. No. 6,088,492 describes a technique that is similar to the previous U.S. Pat. No. 5,972,516.

None of the prior art references describes a satisfactory technique that allows optimization of the interface microroughness of the underlying PECVD optical layers.

SUMMARY OF THE INVENTION

According to the present invention there is provided a method of making a photonic device having at least two optical layers formed over a substrate by plasma enhanced chemical vapor deposition, comprising depositing a thin spin-on glass interlayer between at least one adjacent pair of said at least two layers.

Typically, the photonic device will have a buffer layer, core layer, and cladding layer formed by PECVD. These optical layers may be made of silica, with the core layer being phosphorus doped. A thin SOG layer is formed over the buffer layer and under the PECVD core layer, i.e., at the buffer/core interface, and over the core layer and under the cladding layer, i.e., at the core/cladding interface. It is preferred, but not essential, to provide the SOG interlayer at both interfaces. This novel sandwich technique allows the optical and mechanical properties of the buffer, core and cladding layers to be optimized using the PECVD techniques described in our co-pending patent applications while reducing the roughness of the horizontal surface with the interfacial SOG layers.

The word "thin" has a meaning as would be understood by one skilled in the art in the context of the present invention, but typically relates to a SOG layer about 0.2 $\mu$m thick, and preferably in the range of 0.01 $\mu$m to 2.0 $\mu$m.

Another aspect of the invention provides a method of making a photonic device, comprising depositing an optical buffer layer on the front side of a wafer; forming a first thin spin-on glass layer over said optical buffer layer; subjecting the wafer to a first stabilizing thermal treatment; depositing an optical core layer over said first thin spin-on glass layer; forming a second thin spin-on glass layer over said core layer; subjecting the wafer to a second stabilizing thermal treatment; depositing an optical cladding layer over said second thin spin-on glass layer; and subjecting said wafer to a third stabilizing thermal treatment.

In yet another aspect the invention provides a photonic device comprising at least one pair of optical layers and a thin spin-on glass interlayer formed between said optical layers of said at least one pair.

BRIEF DESCRIPTION OF THE DRAWINGS

The invention will now be described in more detail, by way of example only, with reference to the accompanying drawings, in which:

FIG. 9 shows the 100 GHz grid specified by International Telecommunication Union for the 1.50 $\mu$m S-band, the 1.55 $\mu$m C-band and the 1.60 L-band;

DETAILED DESCRIPTION OF THE PREFERRED EMBODIMENT

Figure 6:
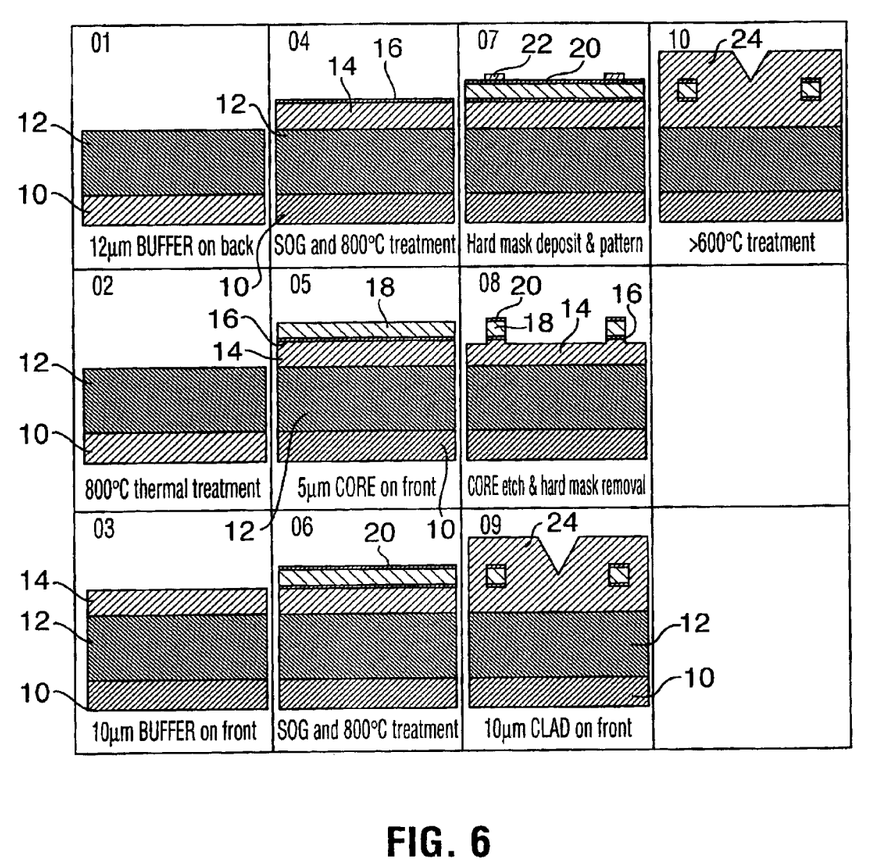
FIG. 6 shows the main fabrication steps of optical waveguides in accordance with one embodiment of the invention using thin spin-on glass layers under and over the core layer

FIG. 6 illustrates the main fabrication steps involved in making an optical waveguide with improved roughness at the horizontal interfaces between the buffer, core and cladding layers of the waveguide. The optical layers are made of undoped silica and phosphorus-doped silica.

In step 01, a 12 $\mu$m buffer layer 10 is deposited on the back of the wafer 12 by PECVD so as to prevent photolithography problems resulting from excessive wafer warp following high temperature heat treatments of the 10 $\mu$m thick buffer and 5 $\mu$m thick core to be deposited on the front of the wafer. This technique is described per se in our co-pending UK patent application serial no, 0028822.5, the contents of which are incorporated herein by reference;

In step 02, a high temperature thermal treatment is performed at more than 600° C. to cause buffer densification and to stabilize the buffer mechanical properties.

In step 03, a 10 $\mu$m buffer optical layer 14 is deposited on the front of the wafer by PECVD.

In step 04, a first 0.2 $\mu$m thick inorganic phosphosilicate spin-on glass layer 16, such as P-112A from Honeywell Electronic Materials, is spun onto the buffer layer. The spin coating is followed by a high temperature thermal treatment at more than 600° C. so as to cause the densification and stabilization of the mechanical properties of buffer and the 1$^{st}$ SOG layer.

In step 05, a 5 $\mu$m core optical layer 18 is deposited on the front of the wafer by PECVD.

In step 06, a second 0.2 $\mu$m thick inorganic phosphosilicate spin-on glass layer, such as P-112A from Honeywell Electronic Materials, is spun onto the core layer 20, followed by a high temperature thermal treatment at more than 600° C. so as to cause the densification and stabilization of the mechanical properties of buffer and of the 1$^{st}$ SOG layer.

In step 07, a hard mask 22 of, for example, SiO$_2$, is deposited and patterned.

In step 08, etching is performed of the 1$^{st}$ SOG planarization layer 16, of the core optical layer and 2$^{nd}$ SOG planarization layer using the hard mask, followed by the removal of the hard mask.

In step 09, a 10 $\mu$m cladding optical layer 24 is deposited on the front of the wafer.

In step 10, a high temperature thermal treatment is performed at more than 600° C. so as to cause cladding densification and to stabilize cladding mechanical properties.

Figure 7:
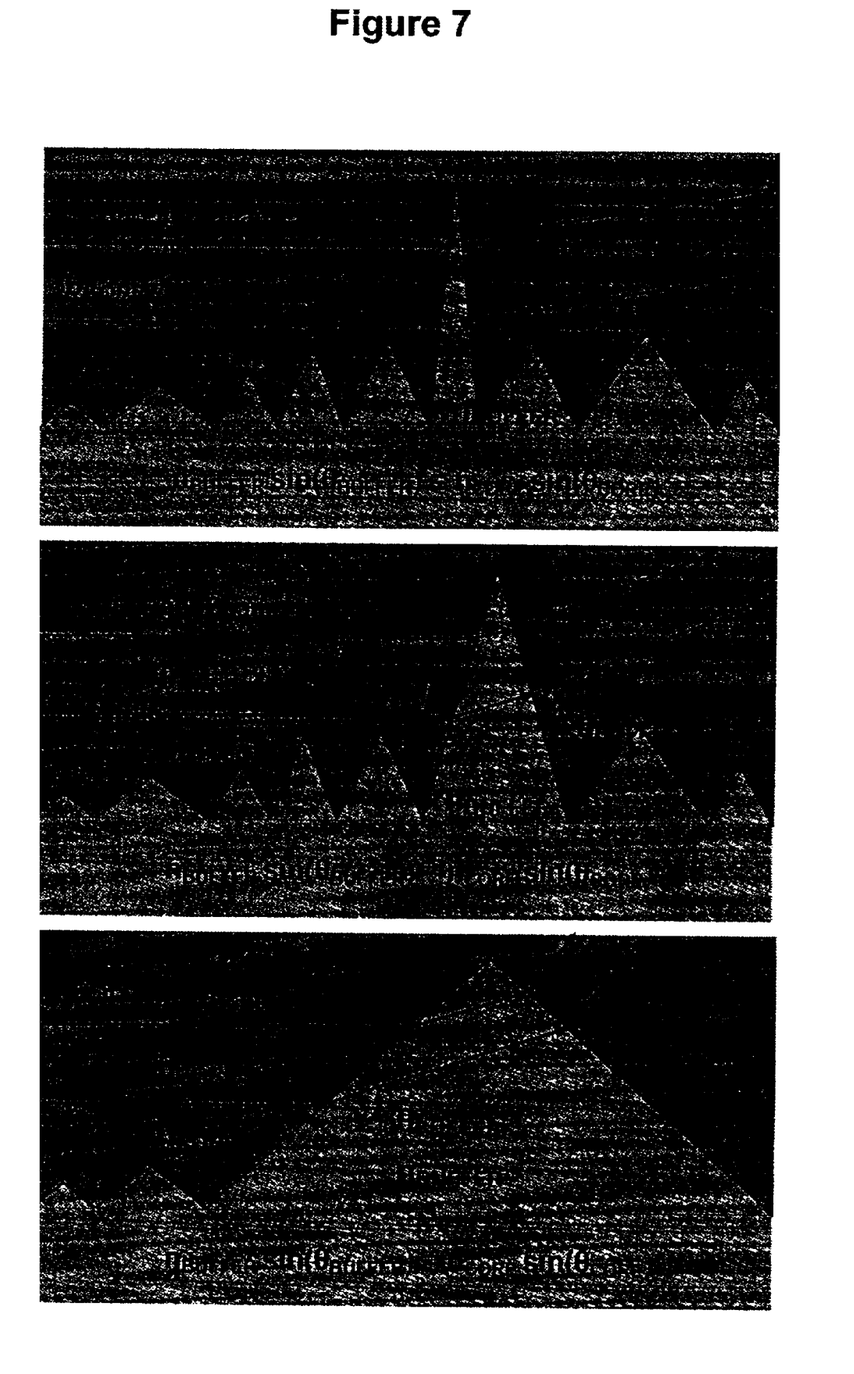
FIG. 7 shows the effect of the interface roughness on the optical loss of an infrared optical waveguide.

FIG. 7 shows the effect of the interfaces roughness on the optical loss of an infrared optical waveguide. It will be seen from FIG. 7 that the micro-surface roughness of the lower (buffer/core) and of the upper (core/cladding) interface causes an increased absorption loss of the optical waveguide due to the random refraction of the infrared light. A smooth interface with a residual surface roughness much smaller than the optical wavelength of the propagating infrared beam would eliminate this interface-induced optical loss.

An interface with a maximum interface roughness ($R_{Max}$) less than about 1% of the optical wavelength (15 to 16 nm or 1% of the typical 1500 to 1600 nm of the 1.50 μm S-band, the 1.55 μm C-band or the 1.60 L-band) would allow the reduction of the interface-induced optical loss.

Figure 8:
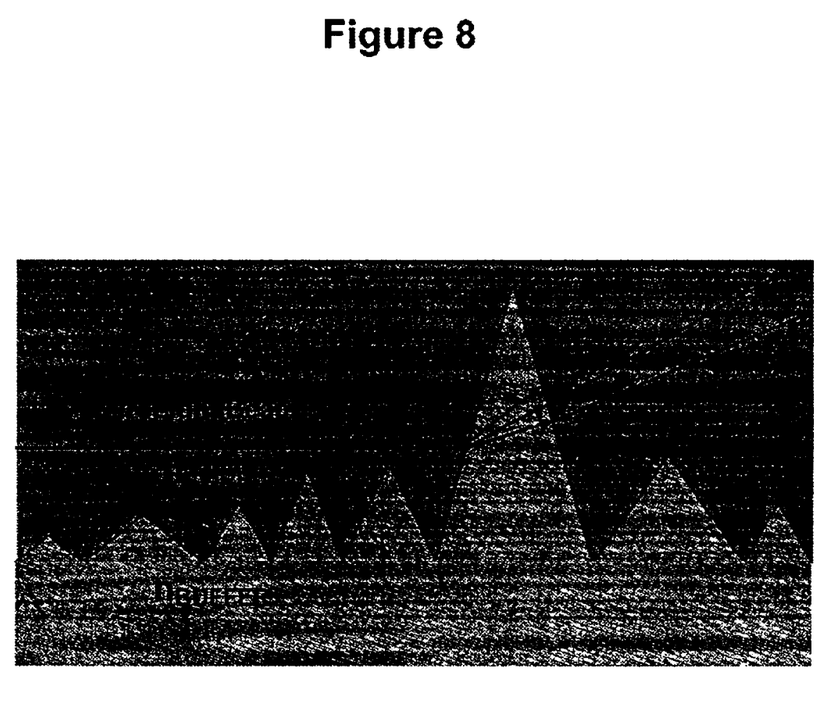
FIG. 8 shows the effect of the interface roughness on the optical dispersion (wavelength dependent loss) of an infrared optical waveguide.

FIG. 8 shows the effect of the interfaces roughness on the optical dispersion (wavelength dependant loss) of an infrared optical waveguide. This optical dispersion characteristic is very important since Mux-Demux and most other optical devices simultaneously handle a large number of infrared beams, each having a specified optical wavelength within the 1.50 μm S-band, 1.55 μm C-band or 1.60 L-band. Within each optical band, the International Telecommunication Union specifies these characteristic wavelengths using a 200 GHz grid, a 100 GHz grid, a 50 GHz grid, or a 25 GHz grid. FIG. 9 shows the 100 GHz ITU grid for these three optical bands. It can be seen from FIG. 8 that the micro-surface roughness of the lower (buffer/core) and upper (core/cladding) interfaces causes an increased dispersion of the various wavelengths of infrared light beams propagating in the optical waveguide; i.e. there will be an increased wavelength dependant absorption loss due to the roughness of these interfaces.

This wavelength dependant absorption loss can be reduced to a negligible level if the maximum interface roughness ($R_{Max}$) is reduced to less than about 1% of the optical wavelength (15 to 16 nm or 1% of the typical 1500 to 1600 nm of the 1.50 μm S-band, the 1.55 μm C-band or the 1.60 L-band).

Figure 10:
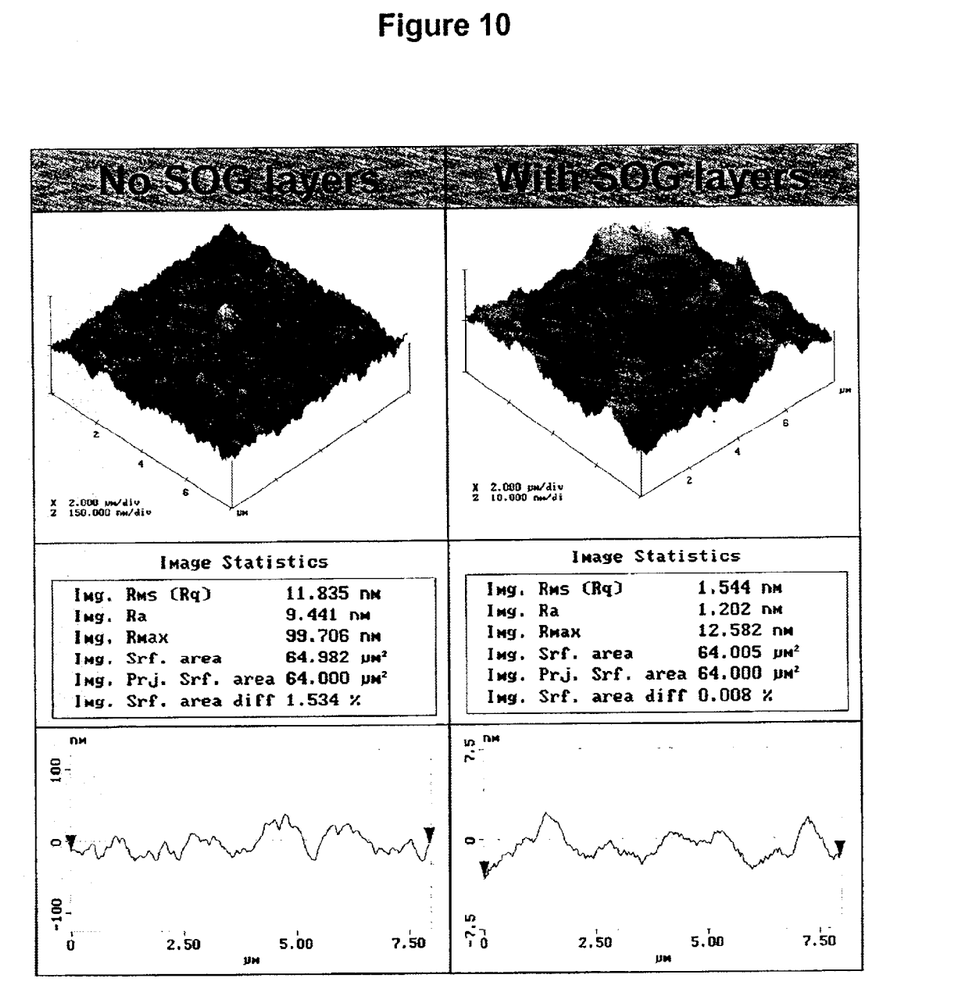
FIG. 10 shows the effect of the SOG layers on the micro-roughness of the surface of a (10 $\mu$m buffer)/(0.2 $\mu$m SOG)/(5 $\mu$m core)/(0.2 $\mu$m SOG) structure.

FIG. 10 shows the effect of adding the SOG layers on the micro-roughness of the surface of the (10 μm buffer)/(0.2 μm SOG)/(5 μm core)/(0.2 μm SOG) structure. These Atomic Force Microscopy (AFM) surface profiling of a 64 μm² (8 μm×8 μm) surface area shows that the upper surface roughness of the core without SOG has a standard deviation, $R_{MS}$, of 11.835 nm; a maximum, $R_{MAX}$, of 99.706 nm; an integrated physical surface area of 64.982 μm²; and a roughness-related surface area of 0.982 μm².

The 0.2 μm SOG layers improve the AFM surface profiling of the same 64 μm² (8 μm×8 μm) a standard deviation, $R_{MS}$, of 1.544 nm; a maximum, $R_{MAX}$, of 12.582 nm; an integrated physical surface area of 64.005 μm²; and a roughness-related surface area of 0.005 μm²;

It will be observed the use of the SOG layers greatly reduces the surface roughness of the upper core surface, which will become the upper core/cladding interface following cladding deposition. It will also be seen the use of the SOG layers decreases the residual maximum surface roughness, $R_{MAX}$, from about 100 nm to less than 13 nm, a value way lower than 1% of the 1550 nm wavelength of the infrared light propagating in the waveguides. The upper-predicted interface-induced optical loss and interface-induced optical dispersion (wavelength dependant loss) of the infrared optical waveguides should be improved when the SOG layers are used.

Figure 11:
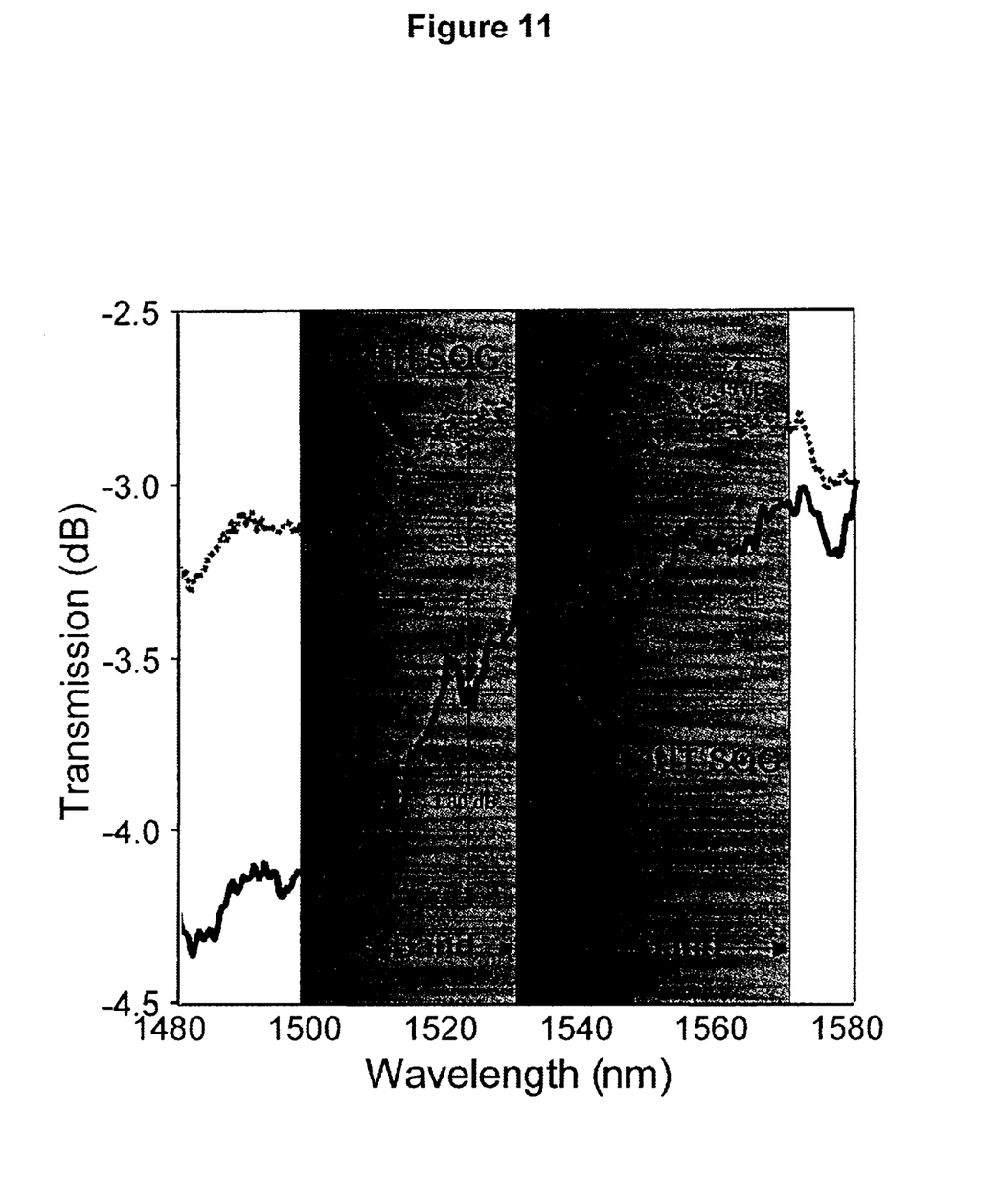
FIG. 11 shows the effect of the SOG layers on the interface-induced optical loss and interface-induced optical dispersion of infrared optical waveguides operating in the 1.50 $\mu$m S-band and the 1.55 $\mu$m C-band.

FIG. 11 demonstrates the beneficial effect of adding the SOG layers on the interface-induced optical loss and interface-induced optical dispersion (wavelength dependant loss) of the infrared optical waveguides. In particular, FIG. 11 demonstrates that the use of the SOG layers at the buffer/core and core/cladding interfaces reduces the average C-Band optical loss of the waveguides by about 0.50 dB (from 3.25 dB without SOG to about 2.75 dB with SOG); reduces the average S-Band optical loss of the waveguides by about 0.85 dB (from 3.75 dB without SOG to about 2.90 dB with SOG); reduces the optical loss dispersion of the waveguides across the C-Band by about 0.40 dB (from 0.85 dB without SOG to about 0.45 dB with SOG); and reduces the optical loss dispersion of the waveguides across the S-Band by about 0.80 dB (from 1.80 dB without SOG to about 1.00 dB with SOG).

These optical measurements show that the use of SOG layers at the interfaces greatly improves the optical loss and optical dispersion performance of optical waveguides operating in the 1.50 μm S-band, the 1.55 μm C-band.

It will be seen that the novel sandwich technique described allows the optical and mechanical properties of the buffer, core and cladding layers to be optimized while using the techniques described in our co-pending patent applications referred to above by reducing the roughness of the horizontal interfaces between buffer, core and cladding layers. The result is optical components with reduced optical absorption and optical dispersion in the 1.50 μm S-band, in the 1.55 μm C-band and in the 1.60 L-band.

Although a preferred embodiment of the invention has been described, one skilled in the art will recognize that many variations of the invention are possible. For example, the spin-on Glass (SOG) layers could be different than P-112A. They could be thinner or thicker than 0.2 μm, preferably in the range between 0.01 μm and 2.0 μm.

A refractive index matching layer can be provided with the underlying buffer layer to further improve the optical performance.

A refractive index matching layer can also be provided with the underlying core layer so as to improve even more the optical performance.

A combination of SOG layers can be employed, for example, wherein the bottom provides a refractive index matching layer with the underlying buffer layer and the upper SOG layer provides a refractive index matching layer with the underlying core layer so as to improve even more the optical performance.

The SOG layer could be a silicate-based solution containing one or more of the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

The SOG layer could be a siloxane-based solution containing one or more of the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

The SOG layer could be made of another precursor leading to an inorganic or a semi-organic layer containing one or more of the following elements: Carbon, Silicon, Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

The treatment temperatures of the SOG layers could be different from 600° C. in the range between 400° C. and 1200° C.

The optical layers involved in the fabrication of the optical waveguides could be fabricated by another technique than PECVD, such as Flame Hydrolysis; Low Pressure Chemical Vapor Deposition (LPCVD); Electron Cyclotron Resonance Deposition (ECRD); Bias Sputtering Deposition (BSD); and Metal-Organic Chemical Vapor Deposition (MOCVD).

The optical layers involved in the fabrication of the optical waveguides could be deposited thinner or thicker than the specified values, in the range between 2.0 and 20 $\mu$m.

The optical layers involved in the fabrication of the optical waveguides could be made of other materials than undoped silica and phosphorus-doped silica. In particular, they could be combinations of: Silica doped with the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71); Silicon nitride (incorporating or not oxygen) with or without the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71); an amorphous silicon doped or not with the following elements: Boron, Phosphorus, Arsenic, Antimony; and a polysilicon doped or not with the following elements: Boron, Phosphorus, Arsenic, Antimony.

The treatment temperatures of the optical layers could be different from 600° C. in the range between 400° C. and 1200° C.

The operating wavelength could be different from the specified 1.50 $\mu$m S-band, in the 1.55 $\mu$m C-band and in the 1.60 L-band and range between 850 nm and 5 $\mu$m.

The Invention is particularly suitable for the fabrication of Mux-Demux devices, but it is also application to other photonics devices, such as Add-After-Drop Filters (AADF) devices; Arrayed Wave Guide (AWG) and Arrayed Wave Guide Grating (AWGG) devices; Athermal Arrayed Wave Guide (AAWGG) devices; Distributed Feedback Laser Diode (DFB-LD) devices; Erbium Doped Fiber Amplifier (EDFA) devices; Four Wave Mixing (FWM) devices; Fresnel Mirror (FM) devices; Laser Diode (LD) devices; Light Emitting Diodes (LED) devices; Mach-Zenhder (MZ), Mach-Zenhder Interferometer (MZI), Mach-Zenhder Interferometer Multiplexer (MZIM) devices; Monitor Photo Diode (MPD) devices; Multi-Wavelength Optical Sources (MWOS) devices; Optical Add/Drop Multiplexers (OADM) devices; Optical Amplifier (AF) devices; Optical Cross-Connect (OCC, OXC) devices; Optical Cross Point (OCP) devices; Optical Filter (OF) devices; Optical Interferometer (OI) devices; Optical Network Unit (ONU) devices; Optical Saw Wave (OSW) devices; Optical Splitter (OS) devices; Optical Switch (OSW) and Optical Switch Module (OSM) devices; Photonic ATM (PATM) switching devices; Planar Lightwave Circuits (PLC) devices; Positive Emitter Coupled Logic (PECL) devices; Quarter Wave (QW) devices; Receiver Photo Diode (RPD) devices; Semiconductor Optical Amplifier (SOA) devices; Spot-Size converter integrated Laser Diode (SS-LD) devices; Sub-Carrier Multiplexing Optical Network Unit (SCM-ONU) devices; Temperature Insensitive Arrayed Wave Guide (TI-AWG) devices; Thermo-Optic (TO) devices and Thermo-Optic Switch (TOS) devices; Time Compression Multiplexing-Time Division Multiple Access (TCM-TDMA) devices; Time Division Multiplexing (TDM) devices; Tunable Receiver (TR) devices; Uniform-Loss Cyclic-Frequency Arrayed Wave Guide (ULCF-AWG) devices; Vertical Cavity Surface Emitting Laser (VCSEL) devices; and Wavelength Dispersive Multiplexing (WDM), Wavelength Dispersive Multiplexing Transceivers (WDMT) devices.

The invention can also be applied to Micro-Electro-Mechanical Systems (MEMS) devices, such as Information Technologies MEMS devices; Medical/Biochemical MEMS devices including: Biochips devices; Lab-On-A-Chip (LOAC) devices; Micro-Total Analysis System ($\mu$-TAS) devices; Automotive MEMS devices; and Industrial/Automation MEMS devices; Environmental Monitoring MEMS devices.

I claim:

1. A method of making a photonic device including an optical waveguide, comprising:

depositing a first optical layer over a substrate by plasma enhanced chemical vapor deposition;

depositing a first thin spin-on glass interlayer over said first optical layer to smooth out surface roughness in said first optical layer; and depositing a second optical layer over said thin spin-on glass interlayer by plasma enhanced chemical vapor deposition;

wherein said first and second optical layers form part of said waveguide; and wherein said optical waveguide comprises a buffer layer, a core layer, and a cladding layer, said first and second optical layers providing respectively said buffer layer and said core layer, and wherein said method further comprises:

depositing a second spin-on glass interlayer over said core layer to smooth out surface roughness in said core layer, and depositing a third optical layer over said second thin spin-on glass interlayer by plasma enhanced chemical vapor deposition to form said cladding layer.

2. A method as claimed in claim 1, wherein said first and second spin-on glass interlayers have a thickness in the range of 0.01 $\mu$m to 2.0 $\mu$m.

3. A method as claimed in claim 1, wherein after forming each said spin-on glass interlayer, said substrate is subjected to thermal treatment to cause densification of said spin-on glass interlayer and the underlying optical layer.

4. A method as claimed in claim 3, wherein said thermal treatment takes place at a temperature in the range between 400° C. and 1200° C.

5. A method as claimed in claim 1, wherein an additional buffer layer is first deposited on a backside of said substrate to prevent warpage.

6. A method as claimed in claim 1, wherein each said spin-on glass interlayer is inorganic phosphosilicate spin-on glass.

7. A method as claimed in claim 1, wherein each said spin-on glass interlayer is a silicate-based solution containing one or more of the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

8. A method as claimed in claim 1, wherein each said spin-on glass interlayer is a siloxane-based solution containing one or more of the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

9. A method as claimed in claim 1, wherein each said spin-on glass interlayer is made of another precursor leading to an inorganic or a semi-organic layer containing one or more of the following elements: Carbon, Silicon, Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

10. A method as claimed in claim 1, wherein each said spin-on glass interlayer comprises a plurality of sublayers, a bottom said sublayer providing a refractive index matching layer with the underlying optical layer and a top one of said sublayers providing a refractive index matching layer with an overlying optical layer.

11. A method as claimed in claim 1, wherein said optical layers are made of silica.

12. A method of making a photonic device including an optical waveguide, comprising:
    depositing an optical buffer layer on the front side of a wafer;
    forming a first thin spin-on glass layer over said optical buffer layer;
    subjecting the wafer to a first stabilizing thermal treatment;
    depositing an optical core layer over said first thin spin-on glass layer;
    forming a second thin spin-on glass layer over said core layer;
    subjecting the wafer to a second stabilizing thermal treatment;
    depositing an optical cladding layer over said second thin spin-on glass layer; and
    subjecting said wafer to a third stabilizing thermal treatment; and
    wherein said buffer layer, said core layer, and said cladding layer form said optical waveguide.

13. A method as claimed in claim 12, wherein prior to depositing said optical buffer layer an anti-warping buffer layer is deposited on the backside of said wafer, and said wafer is subject to a further stabilizing thermal treatment.

14. A method as claimed in claim 12, wherein said stabilizing thermal treatments take place between 400° C. and 1200° C.

15. A method as claimed in claim 12, wherein said stabilizing thermal treatments take place at a temperature of at least 600° C.

16. A method as claimed in claim 12, wherein said stabilizing thermal treatments take place at a temperature of about 800° C.

17. A method as claimed in claim 12, wherein said optical layers are deposited by plasma enhanced vapor deposition.

18. A method as claimed in claim 12, wherein said optical layers are fabricated by a technique selected from the group consisting of: Flame Hydrolysis, Low Pressure Chemical Vapor Deposition (LPCVD), Electron Cyclotron Resonance Deposition (ECRD), Bias Sputtering Deposition (BSD). and Metal-Organic Chemical Vapor Deposition (MOCVD).

19. A method as claimed in claim 12, further comprising the steps of depositing a hard mask after said second thermal treatment, patterning said mask, etching core layer through said hard mask, and removing said hard mask prior to depositing said cladding layer.

20. A method as claimed in claim 12, wherein said spin-on glass is inorganic phosphosilicate spin-on glass.

21. A method as claimed in claim 20, wherein said optical layers are made of silica.

22. A method as claimed in claim 12, wherein said spin-on glass is a silicate-based solution containing one or more of the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

23. A method as claimed in claim 12, wherein said spin-on glass is a siloxane-based solution containing one or more of the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

24. A photonic device comprising:
    an optical buffer layer;
    an optical core layer over said buffer layer; and
    an optical cladding layer over said optical core layer;
    said optical buffer layer, said optical core layer, and said optical cladding layer forming part of an optical waveguide; and
    a thin spin-on glass interlayer to smooth out surface roughness formed between at least one pair of said optical layers; and
    wherein said spin-on glass interlayer is formed at an interface between said buffer layer and said core layer, and between said core layer and said cladding layer.

25. A photonic device as claimed in claim 24, wherein said spin-on glass is inorganic phosphosilicate spin-on glass.

26. A photonic device claimed in claim 24, wherein said spin-on glass is a silicate-based solution containing one or more of the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

27. A photonic device as claimed in claim 24, wherein said spin-on glass is a silicate-based solution containing one or more of the following elements: Boron, Aluminum, Gallium, Indium, Thallium, Carbon, Germanium, Lead, Nitrogen, Phosphorus, Arsenic, Antimony, Bismuth, Titanium, Zirconium, Hafnium, or any other rare earths elements (atomic numbers 57 to 71).

28. A photonic device as claimed in claim 24, wherein said optical layers are made of silica.

29. A photonic device as claimed in claim 28, wherein said core layer comprises phosphorus doped silica.

30. A photonic device as claimed in claim 24, wherein said optical buffer layer is deposited on a substrate and further comprising an anti-warping buffer layer deposited on a backside of said substrate.

31. A photonic device as claimed in claim 30, wherein said anti-warping buffer layer is made silica.

32. A photonic device as claimed in claim 24, wherein the thickness of said at least one spin-on glass interlayer lies in the range of 0.01 $\mu$m to 2.01 $\mu$m.

33. A photonic device as claimed in claim 24, wherein said at least one spin-on glass interlayer comprises a plurality of sublayers including a refractive index matching sublayer.

* * * * *